Figure 1:
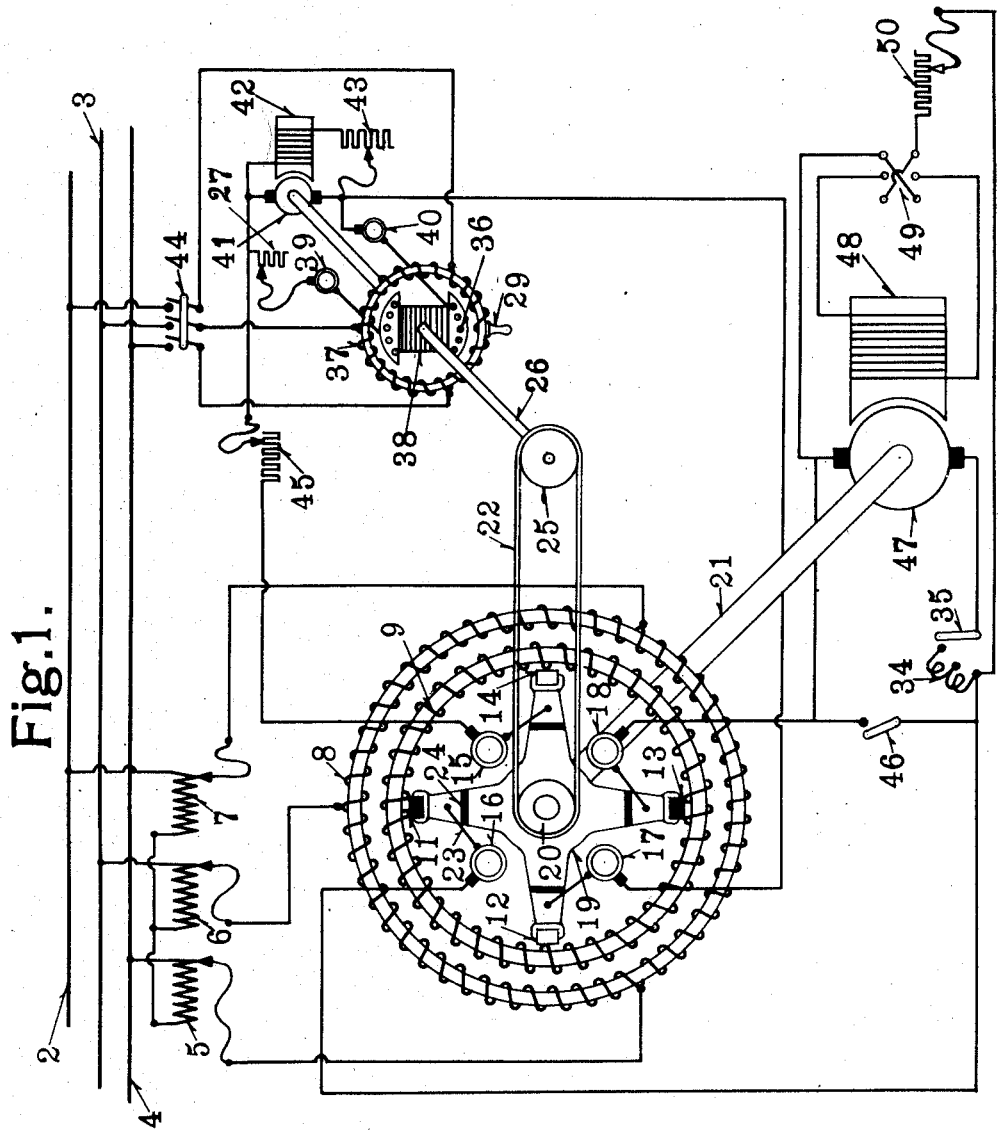

V. A. FYNN.
POLYPHASE MOTOR.
APPLICATION FILED FEB. 14, 1917.

1,387,047.

Patented Aug. 9, 1921.
2 SHEETS—SHEET 1.

INVENTOR
Valère A. Fynn
BY
E. E. Huffman
ATTORNEY

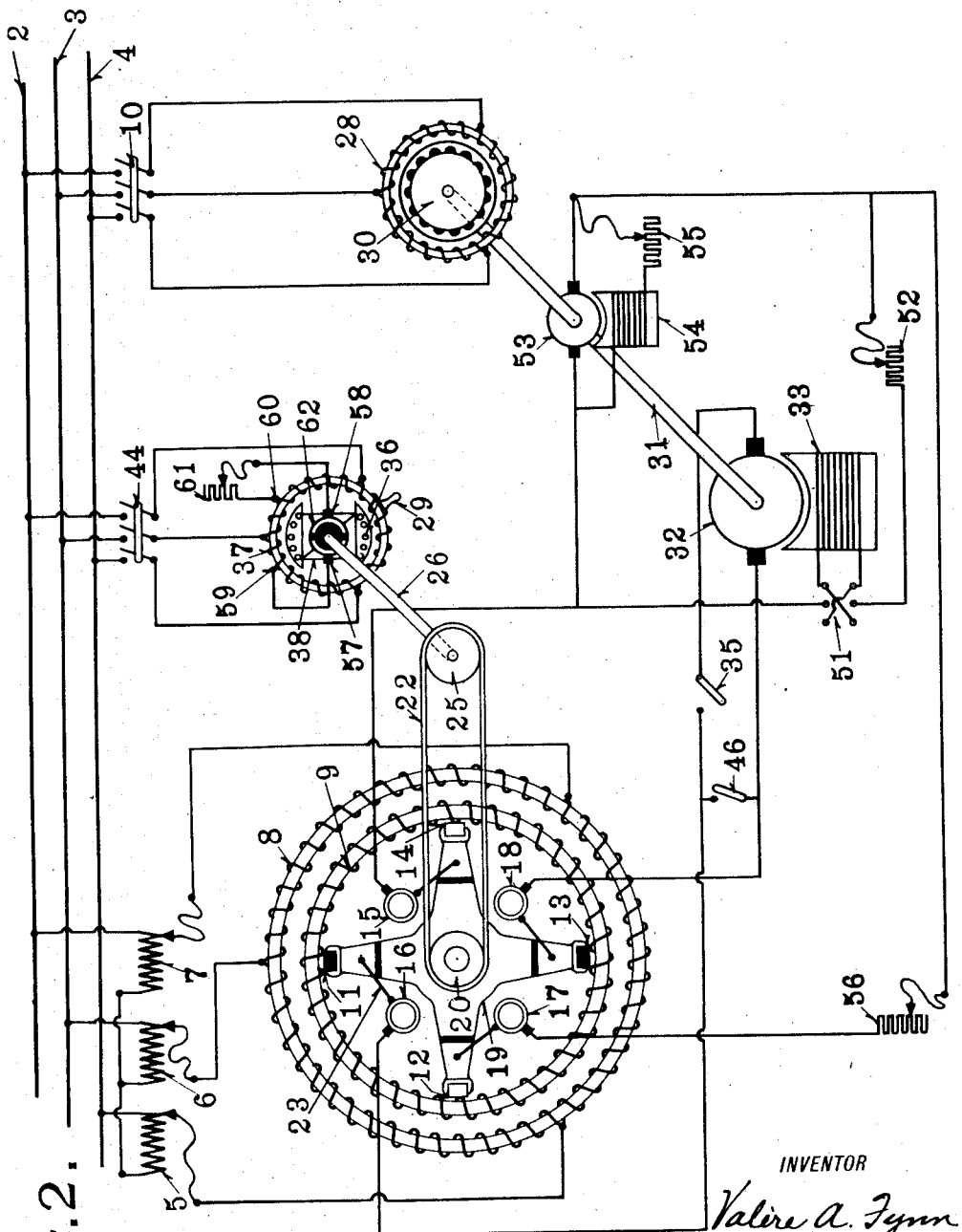

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POLYPHASE MOTOR.

1,387,047.  Specification of Letters Patent.  Patented Aug. 9, 1921.

Application filed February 14, 1917. Serial No. 148,512.

*To all whom it may concern:*

Be it known that I, VALÈRE A. FYNN, a subject of the King of England, residing at the city of St. Louis, State of Missouri, United States of America, have invented a certain new and useful Polyphase Motor, of which the following is such a full, clear, and exact description as will enable any one skilled in the art to which it appertains to make and use the same, reference being had to the accompanying drawings, forming part of this specification.

My invention relates to polyphase motors in which the load currents in the induced member are unidirectional.

Some of my objects are to provide improved means for adjusting the speed of such machines; to place their power factor under the control of the operator, and to render it independent of the load on the machine; and to enable such motors to be started and brought up to speed with a smaller current than was heretofore possible while keeping full control of the power factor.

In carrying out my invention I provide the secondary member with a commuted winding and one set of working brushes per pole pair. I rotate these brushes at synchronous speed with respect to the primary or inducing winding connected to the mains, and while rotating them, always keep them in an axis displaced by 90 electrical degrees with respect to the axis of the nearly constant revolving flux produced by the primary member. To this end, the working brushes must be revolved in the same direction as said flux. Under these conditions, there will appear at the brushes a unidirectional E. M. F. of a magnitude depending on the relative speed between the revolving flux produced by the primary member and the conductors of the secondary member. In order to obtain a nearly synchronous speed, I short-circuit the working brushes. In order to raise the motor speed above the synchronous, I introduce into this brush circuit a unidirectional E. M. F. equal in direction to that appearing at said brushes. To reduce the speed below synchronous, I reverse the direction of the E. M. F. conductively introduced into the circuit of the working brushes. I derive this regulating E. M. F. from any desired outside source, for instance, from a direct-current dynamo electric machine mechanically connected to the shaft of the polyphase motor the speed of which is to be regulated. Under these conditions, this dynamo electric machine will then operate as a direct-current motor at subsynchronous speeds, and as a generator at supersynchronous speeds, helping the motor to drive the load below synchronism, and being driven by the motor above synchronism.

In order to place the power factor of this polyphase motor under the control of the operator, and make it independent of the load on the motor, I provide another set of brushes per pole pair, displace these compensating brushes by 90 electrical degrees from the working brushes, and rotate them at synchronous speed with respect to the primary member and in the same direction as the nearly constant revolving field produced by that member. The axis of these compensating brushes will coincide with the axis of the revolving field produced by the primary member as long as the axis of the working brushes is kept in space quadrature with the axis of the revolving field. By impressing a unidirectional E. M. F. on these brushes, I produce, by means of the commuted winding on the secondary member, a constant magnetization, the direction and magnitude of which I can vary at will. By so selecting the magnitude of the unidirectional E. M. F. impressed on the compensating brushes as to produce a magnetization of same direction and same magnitude as that produced by the primary member, I can eliminate all lagging magnetizing currents in said primary and cause the machine to operate with unity power factor. By increasing the compensating E. M. F., I can cause the primary member to take leading currents. By keeping the compensating brushes always in line with the axis of the revolving field produced by the stator, I can control the power factor of the machine independently of the load; and by keeping the working brushes always in an axis at right angles to that of the revolving field produced by the primary, I make it impossible for the load current in the secondary to produce a magnetization along the axis of said revolving field, and thereby influence the power factor.

In the accompanying drawings, Figure 1 is a diagrammatic two-pole illustration of one embodiment of my invention, while Fig. 2 is a modification thereof and also diagrammatically illustrates a two-pole machine.

Referring more particularly to Fig. 1, this illustrates a two-pole, three-phase motor in which the primary member is stationary while the secondary member is adapted to revolve. The primary carries a distributed winding 8 connected at three equidistant points to the mains 2, 3, 4 by way of the adjustable ratio transformers 5, 6, 7. The rotor carries a commuted winding 9, with which coöperate the brushes 11, 12, 13 and 14, all insulatingly supported by the brush carrier 19 centered on the shaft 21 of the rotor and free to revolve independently of this shaft. A pulley 20 is attached to the brush carrier 19. The brushes are insulated from the body of the carrier 19 by means of insulating strips 24. The brush 11 is connected by means of a lead 23 to the slip ring 16; the brush 12 is similarly connected to the slip ring 17, the brush 13 to the slip ring 18, and the brush 14 to the slip ring 15. In practice, these slip rings would be insulatingly carried by the shaft 21. Fixed brushes coöperating with these slip rings permit the brushes 11, 12, 13 and 14 to be connected to external circuits.

The brushes 11, 13 are the working brushes and contact with diametrically located points of the commuted winding 9; the brushes 12, 14 are the compensating brushes and contact with diametrically located points of the same commuted winding. The axis of the compensating brushes is displaced by 90 electrical degrees from the axis of the working brushes. The armature 47 of a direct-current dynamo electric machine is mounted on the shaft 21 of the polyphase motor and coöperates with a stationary shunt-wound field 48 the winding of which is connected through a reversing switch 49 and a regulating resistance 50 to the working brushes coöperating with the armature 9. The working brushes 11, 13 of the polyphase motor are connected through the slip rings 16, 18 and the adjustable resistance 34 to the armature 47. A switch 46 is so located as to short circuit the brushes of the armature 47 as well as the working brushes of the polyphase motor. An auxiliary synchronous polyphase motor the stationary primary 37 of which is connected to the mains 2, 3, 4 by means of the switch 44, is adapted to drive the brush gear of the polyphase motor by means of the pulley 25, the belt 22, and the pulley 20. The pulley 25 is keyed to the shaft 26, which also carries the revolving member of the synchonous motor. This has two defined polar projections, in which are embedded short circuited conductors 36. It also carries an exciting winding 38 connected to the slip rings 39, 40, which in practice would be insulatingly carried by the shaft 26. The stationary brushes coöperating with these slip rings enable the winding 38 to be connected to external circuits. The armature 41 of a small direct-current exciter is also keyed to the shaft 26 and coöperates with the stationary shunt-wound field structure 42. A regulating resistance 43 is included in the shunt circuit of this exciter. This dynamo supplies the excitation for the synchronous polyphase motor through the slip rings 39, 40 and the regulating resistance 27, and it is also connected to the compensating brushes 12, 14 of the polyphase motor through the slip rings 17, 15 and the regulating resistance 45. While the primary of the synchronous motor is stationary, yet it is so arranged that it can be moved by hand through a certain angle while the machine is in operation. The pulleys 20 and 25 being of the same size, the number of poles of the synchronous motor is the same as the number of poles of the main polyphase motor. This arrangement permits the compensating and working brushes of the main motor to be revolved at synchronous speed with respect to the stationary primary of said machine.

In order to ascertain the proper position for the working brushes, I interrupt their circuit, as well as the circuit of the compensating brushes, start the synchronous motor by closing the switch 44, adjust its power factor to unity by means of the regulating resistance 27, and impress on the stator of the polyphase motor a fraction of the line voltage by means of the adjustable ratio transformers 5, 6, 7. I then connect a voltmeter across the slip rings 16, 18, and move the stator 37 of the synchronous motor by means of the handle 29, noting the voltmeter reading for every position of 37. By plotting these readings, it is easy to find the exact position of the stator 37 for the maximum voltmeter reading. The stator should be locked in this position, for it corresponds to the best, in fact to the only proper position of the working brushes 11, 13. Apart from any slip of the belt 22 (and in practice no such belt would be used, the rocker 19 being directly mounted on the shaft 26, or positively geared to same), the axis of the brushes 11, 13, or of the brushes 12, 14 will always move in unison with the axis of the revolving member of the synchronous motor. For a given power factor of the synchronous motor, the axis of magnetization of its secondary member will always have a certain space relation to the axis of the primary magnetization, which revolves synchronously. A movement of the stator 37 in the one or the other direction, will therefore immediately be followed by a corresponding movement of the coöperating rotor, the synchronous rotation of said rotor being momentarily accelerated or retarded. In this way, it is possible to displace the axis of the brushes 11, 13, or of the brushes 12, 14, with respect to the axis of the nearly constant revolving field produced by the primary 8.

When the axis of the brushes 11, 13 is at right angles to the axis of the revolving field, then the voltage appearing at the brushes 11, 13, and registered by the voltmeter connected to the slip rings 16, 18, will be a maximum. At the same time, the voltage between the brushes 12, 14 will be zero, provided these brushes are displaced by 90 electrical degrees from the working brushes. The correct position of the whole brush gear can therefore also be found by connecting a voltmeter to the slip rings 15, 17 and moving 37 until the voltage at said slip rings becomes zero. During these adjustments, the rotor 9 of the polyphase motor will remain at rest, because all its circuits are interrupted. The speed of the conductors of 9 relatively to the revolving field produced by 8, will therefore be equal to the synchronous speed of the motor. Once the position of the stator 37 for the correct position of the brushes on the main motor has been ascertained, it can, barring accidents, always be reproduced by starting the synchronous machine and exciting it to the extent to which it was excited during the preliminary tests. Should any subsequent adjustments become necessary, they can always be carried out by means of the handle 29.

In order to start the main motor, I first bring the synchronous motor up to speed, thus causing the brush carrier 19 to revolve synchronously with respect to the primary 8 of the main motor. I then connect the primary 8 of the main motor to the full line voltage, but in such a way that the nearly constant revolving flux produced by said primary will revolve in the same direction as the brush carrier 19. Whether this flux revolves in the same direction as 19, or not, can readily be ascertained, when desired, by means of a voltmeter connected across the brushes 12, 14 or 11, 13. If connected across the brushes 12, 14, this voltmeter will register a high alternating voltage, if the direction of rotation of the revolving field does not coincide with that of the brush carrier 19. If these directions of rotation do coincide and the brushes 12, 14 are correctly placed, then the voltmeter will not register any voltage at all. The third step is to close the compensating circuit and to so adjust the direct current sent into the rotor commuted winding 9 by means of the brushes 12, 14, as to secure the desired power factor at the terminals of the main motor. If unity power factor is desired, then the direct-current excitation should be increased until all lagging magnetizing currents are eliminated from the stator winding 8. The revolving flux in the main motor will now revolve synchronously with respect to the commuted winding 9, which is still stationary, and since this flux is a maximum, then the voltage appearing at the brushes 11, 13 will also be a maximum. Independently of the magnitude of this unidirectional voltage, it can be utilized for the purpose of exciting the direct-current dynamo electric machine mounted on the shaft 21 of the main motor.

In order to secure a large torque, the connections between the working brushes and the exciting winding on the field structure 48 must be so made as to cause the voltage generated by the armature 47, when in motion, to oppose the voltage appearing at the working brushes 11, 13 of the main motor. Under these conditions, the main motor will tend to a subsynchronous speed when the working circuit of its secondary is closed; the dynamo electric machine 47, 48 will act as a direct-current motor and will add its torque to that of the main motor. Assuming that the brush carrier 19 revolves clockwise, then the rotor 9 of the main motor will also tend to revolve clockwise when the circuit of the working brushes 11, 13 is closed, and the reversing switch 49 should therefore be placed in such a position that when the exciting circuit 48 is closed at 50 the current sent through said circuit from the brushes 11, 13 will be of such a direction as to produce in the armature 47, as soon as it revolves clockwise, an E. M. F. opposed to that appearing at the working brushes 11, 13.

In order to operate under the most economical conditions, it is best to fully excite the field 48 at starting by cutting out all of the regulating resistance 50. The next starting operation is to close switch 35, thus connecting the brushes coöperating with the armature 47 to the working brushes 11, 13 of the main motor through the starting resistance 34. By cutting out enough of this resistance 34, the torque of the main motor and of the dynamo electric machine 47, 48 can be raised to a point where the combination will start, when the resistance 34 can be entirely elminated, step by step, thus leaving the brushes of the direct-current dynamo electric machine connected directly to the working brushes of the main motor. In order to increase the speed of the combination, it is necessary to decrease the excitation of the dynamo electric machine 47, 48. When that excitation is reduced to zero, then the speed of the main motor will be nearly synchronous. The resistance of the armature 47 merely occasions a loss in efficiency and speed, and it is advisable, if the machine is to run at synchronous speed for any length of time, to close switch 46, thus short-circuiting the working brushes 11, 13.

If a supersynchronous speed is required, then the short-circuiting switch 46 should be opened, the reversing switch 49 should be positioned to permit the field 48 to be excited in a direction which will produce in the clockwise revolving armature 47 an E. M. F. of same direction as that appearing at the working brushes 11, 13 of the main motor. After this, the exciting circuit of the dynamo electric machine 47, 48 can be closed at 50, and the regulating resistance in that circuit can be gradually cut out. The greater the excitation of 47, 48, the higher the speed of the combination above the synchronous.

If it is desired to avoid the use of the starting resistance 34, then the stator 8 should be connected to a fraction of the line voltage by means of the adjustable ratio transformers 5, 6, 7; the compensating circuit should be regulated at 45 to eliminate lagging magnetizing currents in said stator, and the working brushes should be directly connected to the regulating dynamo electric machine 47, 48 by closing switch 35, so as to cut out all of the resistance 34, placing the switch 49 in the correct position for obtaining the lowest speed of the combination, and cutting out all of the regulating resistance 50. If the motor will not start, then it is only necessary to increase the terminal voltage of the main motor and correspondingly increase the unidirectional compensating current, until the normal terminal voltage and the normal compensating current are reached. Under these conditions, the main motor will start with a weak field and a large current, but its power factor will be under control during the whole of the starting operation, and there will be no losses other than those due to the resistance and iron losses of the several machines, while the torque of the main motor will, at starting, always be increased by the torque of the regulating dynamo electric machine 47, 48.

As long as the terminal voltage of the main motor is kept constant, and the direct-current excitation is constant, the power factor of the main motor will remain practically unchanged. The fact that the load current in the secondary 9 is unidirectional, does away with all reactance effects in that member. The commutation at the working brushes 11, 13, should be as satisfactory as is the case in a neutralized direct-current machine, for the rotor load current is at all times faithfully reproduced in the stator 8, where it appears as a three-phase current, producing a nearly constant unidirectional magnetization revolving at synchronous speed with respect to the stator 8 and always coaxial with the brush axis 11, 13. The compensating brushes 12, 14 are in the axis of the main field of the motor. When there is no relative motion between this field and the commuted winding 9, then there is no tendency at all for the brushes 12, 14 to spark. But when the motor speed differs materially from the synchronous, then E. M. F's are generated in the coils short-circuited by the brushes 12, 14, and sparking might take place in case low resistance brushes are used. This is, however, not at all necessary, for the exciting or compensating current carried by these brushes is a small percentage of the load current carried by the brushes 11, 13, so that very high resistance carbon can be utilized for the compensating brushes. The method of starting, in which the primary is at once connected to the full line voltage, involves a slight loss during its initial stages, that is, at very low speeds, until the armature 47 has developed a counter electromotive force sufficient to permit the total exclusion of the starting resistance 34. In the arrangement shown in Fig. 2, even this slight loss is eliminated. While the dynamo electric machine 47, 48, illustrated in Fig. 1, is of the shunt type, yet those skilled in the art will understand that a compound wound or a series wound dynamo electric machine may be used instead, the speed characteristic of the main motor being determined by the speed characteristic of the dynamo electric machine coupled to its axis and electrically connected to its working brushes.

Referring to Fig. 2, the asynchronous polyphase motor has a stationary primary and a revolving secondary. The stator is provided with a winding 8 connected at three equidistant points to the mains 2, 3, 4 by way of the adjustable ratio transformers 5, 6, 7. The rotor carries a commuted winding 9, with which coöperate two sets of brushes insulatingly supported on the brush carrier 19 provided with a pulley 20 and free to revolve about the shaft of the rotor. Electrical access to the compensating brushes 12, 14 is had by means of the slip rings 17, 15 and brushes coöperating therewith, while the working brushes 11, 13 can be connected to external circuits by means of the slip rings 16, 18 and stationary brushes coöperating therewith. The slip rings, in practice, are insulatingly carried by the rotor shaft. The axis of the brushes 12, 14 is displaced by 90 electrical degrees from the axis of the brushes 11, 13. The brush carrier is driven by means of a two-pole, three-phase synchronous self-excited motor, the shaft 26 of which carries a pulley 25 connected to the pulley 20 by means of the belt 22. The primary member of the synchronous motor is stationary and is provided with a winding 37 connected at three equidistant points to the mains 2, 3, 4 by means of the switch 44. The revolving member is keyed on the shaft 26, is of the defined polar projection type with short circuited conductors embedded in the poles, and carries an exciting winding 38 connected to a two-part commutator 62 coöperating with the stationary brushes 57, 58 connected to two points 59, 60 of the primary 37, with the interposition of a regulating resistance 61.

A three-phase asynchronous squirrel-cage motor the primary 28 of which can be connected to the mains by means of the switch 10, has a secondary 30 of the squirrel-cage type keyed to the shaft 31 which drives the regulating direct current dynamo electric machine 32, 33 and the direct current exciter 53, 54. The armature 32 of the regulating dynamo electric machine is connected to the working brushes 11, 13 of the main motor by way of the switch 35, while the compensating brushes 12, 14 of the main motor are connected to the armature 53 of the direct-current exciter through the regulating resistance 56. The exciting winding on the field structure 33 of the regulating dynamo is also connected to the armature 53 of the exciter through the reversing switch 51, and the regulating resistance 52. The exciter is of the shunt type, the winding on its field structure being connected to its armature 53 by way of the regulating resistance 55. A switch 46 is arranged to short circuit the working brushes 11, 13 of the main motor.

It is seen that the arrangement shown in Fig. 2 differs from that illustrated in Fig. 1, in that the regulating dynamo electric machine connected to the working brushes of the polyphase motor, is not geared to the shaft of the motor itself, but is driven by an independent polyphase motor. This machine also drives the direct-current exciter which provides the compensating current for the main motor and the exciting current for the regulating dynamo. The synchronous polyphase motor driving the brush gear is self-excited, instead of being separately excited, as in Fig. 1. The exciting E. M. F. for this synchronous machine is derived from a portion of its stator winding. It is an alternating E. M. F. which is rectified by means of the commutator 62.

The position of the compensating and working brushes on the main motor in Fig. 2 is ascertained in the manner already described in connection with Fig. 1. When this position has been found and the corresponding excitation of the synchronous motor determined by the position of the brushes 57, 58, and the magnitude of the regulating resistance 61, then I prefer to operate this combination as follows:—

I first bring the brush gear of the main motor up to speed by connecting the synchronous polyphase motor to the main. It will start readily, because of the short circuited conductors embedded in the pole pieces; and will reach its synchronous speed because of the self-exciting feature embodied in the machine and the operation of which is now well understood. When the brush carrier 19 revolves at synchronous speed with respect to the primary 8, I connect said primary to the full line voltage, start the auxiliary motor 28, 30 by closing switch 10, leave the switches 35 and 46 open for the time being, and adjust the resistance 56 so as to secure the desired power factor at the terminals of the main motor. If unity power factor is desired, then the resistance 56 is so adjusted as to eliminate all lagging magnetizing currents from the main motor. Under these conditions the commuted winding 9 of the main motor will be at rest and a certain unidirectional voltage will appear at the working brushes 11, 13. I now so excite the regulating dynamo 32, 33 by closing switch 51 and adjusting the resistance 52, as to obtain, at the brushes of the armature 32, a unidirectional E. M. F. equal and opposed to that appearing at the working brushes 11, 13 of the main motor. This condition being reached, I close switch 35, thus connecting the armature 32 to the working brushes 11, 13. Since the voltage appearing at the brushes 11, 13 and at the terminals of the armature 32 are equal and opposed, then no current will flow through this circuit and the main motor will not exert any torque. In order to start the main motor, I now reduce the excitation of the dynamo electric machine 32, 33, thus causing a current to flow from the working brushes 11, 13 to the armature 32. By reducing the excitation of the field structure 33, I can raise the working current in the rotor of the main motor to the point where the latter will begin to move. I can operate this motor, simply by adjusting the magnitude and direction of the excitation of the regulating machine 32, 33, at any desired speed from a few revolutions per minute up to the synchronous, and even up to a speed considerably in excess of the latter. Synchronous speed will be obtained when the current in 33 is reduced to zero, at which time it will be advantageous to close switch 46, so as to cut out the useless resistance of the armature 32 in the working circuit of the main motor. In order to secure a supersynchronous speed, switch 46 should be open, switch 51 reversed, and the excitation of 33 gradually increased.

It will be observed that when the main motor is started in the manner just described, it does so under the best possible conditions. Its stator being directly connected to the mains, the motor flux is at a maximum. The magnitude of the torque-producing rotor current is adjusted to the desired amount without loss, because no resistances are used in the load circuit, regulation being obtained by means of an opposing E. M. F. Throughout the starting period the power factor can have any desired value, because it is entirely under the control of the operator. The machine can therefore be started with unity power factor, and the torque per ampere will be a maximum throughout because the motor flux is a maximum and because there is no phase displacement in the secondary of the main motor. Any energy conveyed to the rotor of the main motor and not utilized for the production of the starting torque, is returned to the mains by way of the dynamo electric machine 32, 33 acting as a motor, driving the polyphase machine 28, 30 slightly above synchronism and causing same to act as an asynchronous generator. The fact that the synchronous motor is not called upon to do anything more than drive the brush carrier 19, is sometimes advantageous, for it means a nearly constant load on this motor. Every variation of load brings about, in the case of a synchronous motor, a movement of the rotor axis relatively to the stator axis, which, in the case of Figs. 1 and 2, means a corresponding displacement of the compensating and load brushes of the main motor. If the load variation on the synchronous motor is very large, then the corresponding brush movement may reach a degree which will necessitate a correction of the brush position by means of the handle 29, or by changing the excitation of the synchronous machine. The fact that in Fig. 1 the synchronous motor drives the exciter 41, 42, as well as the brush gear 19, might lead to this complication, in case the load on the exciter is greatly varied.

It will be understood that my invention is applicable to polyphase motors in which the primary windings are located on the rotor and the secondary windings on the stator, provided care is taken to always revolve the brush gear coöperating with the secondary at synchronous speed with respect to the primary, and in the same direction as the revolving field produced by this member. In case the primary member is located on the rotor, it will be necessary, in order to satisfy this condition, to revolve the brush gear coöperating with the stator in a direction opposed to that in which the rotor revolves and at a speed equal to the synchronous speed of the motor less the actual speed of the rotor.

Having fully described my invention, what I claim as new and desire to secure by Letters Patent of the United States is:

1. In an alternating current motor, the combination of an inducing member provided with a polyphase winding, an induced member provided with a commuted winding and two sets of brushes per pole pair coöperating therewith, means for supplying a direct current phase compensating E. M. F. to one set of brushes, means closing the circuit of the other set of brushes, and means for revolving all of the brushes at such speed as to cause the relative speed of the brushes and the inducing member to equal the synchronous speed.

2. In an alternating current motor, the combination of an inducing member provided with a polyphase winding, an induced member provided with a commuted winding and two sets of brushes per pole pair coöperating therewith, means for supplying a direct current phase compensating E. M. F. to one set of brushes, means for closing the circuit of the other set of brushes, means for revolving all of the brushes at such speed as to cause the relative speed of the brushes and the inducing member to equal the synchronous speed, and means for adjusting the axis of said brushes to maintain said axis in constant relative position with respect to the axis of the revolving field produced by the inducing member.

3. In an alternating current motor, the combination of an inducing member provided with a polyphase winding, an induced member provided with a commuted winding and two sets of brushes per pole pair coöperating therewith, means for supplying a direct current phase compensating E. M. F. to one set of brushes, means for closing the circuit of the other set of brushes, means for revolving all of the brushes at such speed as to cause the relative speed of the brushes and the inducing member to equal the synchronous speed, and means for adjusting the axis of one set of said brushes to maintain said axis in a position displaced ninety electrical degrees from the axis of the revolving field produced by the inducing member.

4. In an alternating current motor, the combination of an inducing member provided with a polyphase winding, an induced member provided with a commuted winding and two sets of brushes per pole pair coöperating therewith, said sets of brushes being displaced by 90 electrical degrees from each other, means for supplying a direct current phase compensating E. M. F. to one set of brushes, means closing the circuit of the other set of brushes, and means for revolving all of the brushes at such speed as to cause the relative speed of the brushes and the inducing member to equal the synchronous.

5. In an alternating current motor, the combination of an inducing member provided with a polyphase winding, an induced member provided with a commuted winding and two sets of brushes per pole pair coöperating therewith, said sets of brushes being displaced by 90 electrical degrees from each other, means for supplying a direct current phase compensating E. M. F. to one set of brushes, a source of direct current E. M. F. connected to the other set of brushes, and means for revolving both sets of brushes at such speed as to cause the relative speed of the brushes and the inducing member to equal the synchronous.

6. In an alternating current motor, the combination of an inducing member provided with a polyphase winding, an induced member provided with a commuted winding and two sets of brushes per pole pair coöperating therewith, said sets of brushes being displaced by 90 electrical degrees from each other, a source of direct current E. M. F. connected to one set of brushes, means for reversing the direction of the E. M. F. from said source, means for supplying a compensating E. M. F. to the other set of brushes, and means for revolving both sets of brushes at such speed as to cause the relative speed of the brushes and the inducing member to equal the synchronous.

7. In an alternating current motor, the combination of an inducing member provided with a polyphase winding, an induced member provided with a commuted winding and two sets of brushes per pole pair coöperating therewith, said sets of brushes being displaced by 90 electrical degrees from each other, means for supplying a direct current phase compensating E. M. F. to one set of brushes, a source of direct current E. M. F. connected to the other set of brushes, means for regulating the E. M. F. supplied to one set of brushes, and means for revolving both sets of brushes at such speed as to cause the relative speed of the brushes and the inducing member to equal the synchronous.

8. In an alternating current motor, the combination of an inducing member provided with a polyphase winding, an induced member provided with a commuted winding and two sets of brushes per pole pair coöperating therewith, said sets of brushes being displaced by 90 electrical degrees from each other, means for supplying a direct current phase compensating E. M. F. to one set of brushes, a source of direct current E. M. F. connected to the other set of brushes, means for regulating the current through each set of brushes, and means for revolving said brushes at such speed as to cause the relative speed of the brushes and the inducing member to equal the synchronous.

9. In an alternating current motor, the combination of a stationary inducing member provided with a polyphase winding, a revolving induced member provided with a commuted winding and two sets of brushes per pole pair coöperating with said commuted winding, said brushes being displaced by 90 electrical degrees from each other, means for revolving said brushes in synchronism with the revolving field produced by the inducing member, the axis of one set being in coincidence with the axis of said field, means for supplying a compensating E. M. F. to said set, and means closing the circuit of the other set of brushes.

10. In an alternating current motor, the combination of a stationary inducing member provided with a polyphase winding, a revolving induced member provided with a commuted winding and two sets of brushes per pole pair coöperating with said commuted winding, said brushes being displaced by 90 electrical degrees from each other, means for revolving said brushes in synchronism with the revolving field produced by the inducing member, the axis of one set being in coincidence with the axis of said field, means for supplying a compensating E. M. F. to said brushes, and means for conductively supplying a direct current E. M. F. to the brushes which are in quadrature with the axis of the revolving field.

11. In an alternating current motor, the combination of an inducing member provided with a polyphase winding, an induced member provided with a commuted winding, brushes coöperating with said commuted winding, means for supplying a compensating E. M. F. to said brushes, means for revolving said brushes at such speed as to cause the relative speed of the brushes and the inducing member to equal the synchronous speed, and means for adjusting the axis of said brushes to maintain said axis in coincidence with the axis of the revolving field produced by the inducing member.

12. In an alternating current motor, the combination of an inducing member provided with a polyphase winding, an induced member provided with a commuted winding and two sets of brushes per pole pair coöperating with said commuted winding, said sets of brushes being displaced by 90 electrical degrees from each other, a synchronous motor for revolving said brushes, an auxiliary direct current dynamo connected to one set of brushes of the main motor, and means for supplying a direct current compensating E. M. F. to the other set of brushes.

13. The method of starting a polyphase motor having an inducing member, an induced member provided with a commuted winding, a set of working brushes and a set of compensating brushes coöperating with said winding, which consists in revolving both sets of brushes at synchronous speed with respect to the inducing member, impressing full line voltage on the inducing member, impressing a direct current voltage on the compensating brushes, connecting the working brushes to a source of direct current E. M. F., and varying the magnitude of said last named E. M. F.

14. The method of starting a polyphase motor having an inducing member, an induced member provided with a commuted winding, a set of working brushes and a set of compensating brushes coöperating with said winding, and an auxiliary direct current dynamo electric machine, which consists in revolving both sets of brushes at synchronous speed with respect to the inducing member, impressing full line voltage on the inducing member, impressing a direct current voltage on the compensating brushes of such magnitude as to eliminate all lagging currents in the inducing member, exciting the auxiliary dynamo electric machine to produce an E. M. F. equal to that appearing at the working brushes, connecting the auxiliary dynamo electric machine to the working brushes in such manner as to cause the E. M. F. appearing at said brushes to oppose the E. M. F. of the dynamo electric machine, and finally reducing the magnitude of the E. M. F. produced by the dynamo electric machine.

15. The method of adjusting the speed of a polyphase motor having an inducing member, an induced member provided with a commuted winding, a set of working brushes and a set of compensating brushes coöperating with said winding and revolved at synchronous speed with respect to the inducing member, each set of brushes being connected to a source of direct current E. M. F., which comprises varying the magnitude of the E. M. F. produced by the source connected to the working brushes to produce subsynchronous speeds, and changing the direction and varying the magnitude of said E. M. F. to produce supersynchronous speeds.

In testimony whereof, I have hereunto set my hand and affixed my seal.

VALÈRE A. FYNN. [L. S.]